T. R. COOK.
STORAGE BATTERY.
APPLICATION FILED JULY 21, 1920.

1,388,850. Patented Aug. 30, 1921.

Thomas R. Cook,
INVENTOR.

BY

ATTORNEY

UNITED STATES PATENT OFFICE.

THOMAS R. COOK, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

STORAGE BATTERY.

1,388,850.  Specification of Letters Patent.  Patented Aug. 30, 1921.

Application filed July 21, 1920. Serial No. 397,859.

*To all whom it may concern:*

Be it known that I, THOMAS R. COOK, a citizen of the United States, residing at Pittsburgh, in the county of Allegheny and State of Pennsylvania, have invented certain new and useful Improvements in Storage Batteries, of which the following is a specification.

My invention relates to storage batteries, and has for an object the provision of a storage battery which can be employed in place of the usual dry cell in the tube-shaped portable electric "flash-lights."

I will describe one form of battery embodying my invention, and will then point out the novel features thereof in claims.

Figure 1:
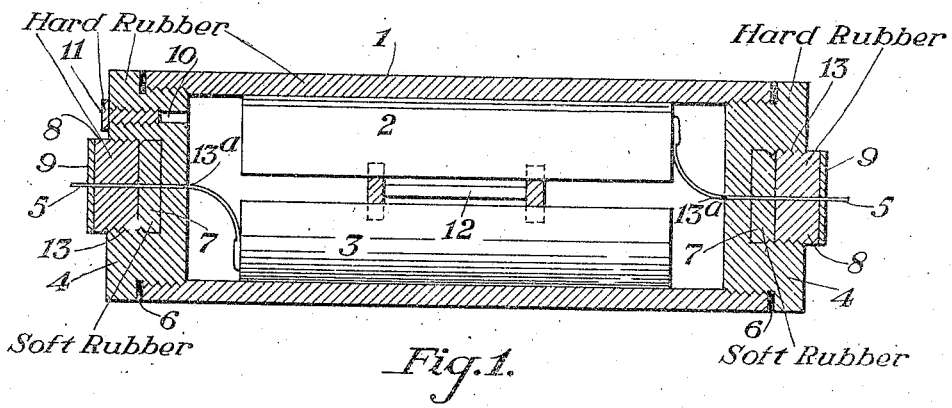
Figure 2:
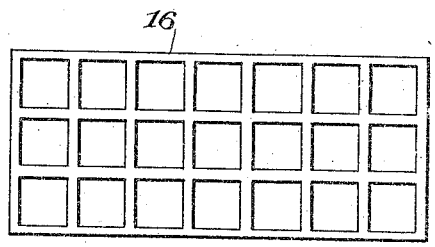
Figure 3:
Figures 4, 5:
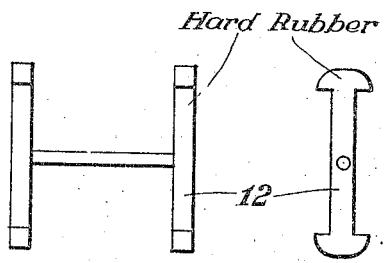
Figure 6:
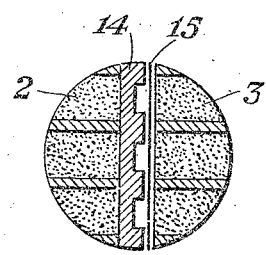

In the accompanying drawing, Figure 1 is a view showing in longitudinal cross-section one form of battery embodying my invention. Fig. 2 is a view showing in elevation one of the plate grids employed in the battery shown in Fig. 1. Fig. 3 is an end view of the grid shown in Fig. 2. Fig. 4 is a view showing in side elevation one form of spacer which may be employed in the battery shown in Fig. 1, and Fig. 5 is an end view of the spacer shown in Fig. 4. Fig. 6 is a transverse sectional view of the battery shown in Fig. 1, with container removed, and showing a modified form of means for spacing the plates.

Similar reference characters refer to similar parts in each of the several views.

Referring first to Fig. 1, the battery comprises a tubular container 1 of hard rubber, glass, or other non-conducting material, which incloses a positive plate 2 and a negative plate 3. Each plate comprises, as usual, a grid 16 of antimony lead, or other suitable material, (see Figs. 2 and 3) filled with an active material in the form of a paste. As shown in Figs. 2 and 3, each of these plates is semi-cylindrical in shape, the curvature of the convex surface of the plate corresponding substantially to the curvature of the inside of the tube 1. The two plates are oppositely disposed within the tube, as shown in Fig. 1, and each plate is nearly as long as the tube 1, there being sufficient clearance at each end of the plates, however, to accommodate the necessary electrolyte and the necessary means hereinafter explained for closing the ends of the tube. Although I have stated that each plate is semi-cylindrical in shape, I do not mean that the cross-section of each plate is, necessarily, an exact half of a circle. Preferably each cross-section is somewhat less than a half of a circle, so that there is a reasonable amount of space between the two plates, as shown in Fig. 1.

Each end of the tube 1 is threaded to receive a threaded cap 4 of hard rubber or similar material, a gasket 6 of soft rubber or other similar material, being located at the joint between the tube and each cap 4 to prevent leakage of electrolyte. Each cap 4 is provided with a central recess 13 at the bottom of which is a hole 13ª, and passing through each hole is a terminal wire 5, which is electrically connected with one of the plates. In the bottom of the recess 13 is a soft rubber gasket 7, and on top of this gasket is a threaded follower 8, preferably of hard rubber. The gasket 7 and the follower 8 are each provided with a hole of sufficient size to accommodate the terminal wire 5. The recess 13 is threaded to match the threads on the follower 8 so that this follower may be turned down to compress the gasket 7 and so prevent leakage of the electrolyte through the cap 4. Vulcanized to the top of each follower 8 is a lead washer 9, which is also provided with a hole to accommodate the terminal wire 5. After the follower 8 is screwed into its final position, the wire 5 is cut off close to the outer surface of the washer 9 and is then permanently connected to the washer by suitable means, such as a soldering iron or a flame.

The space between the two plates 2 and 3 is filled with electrolyte in suitable form. For example, this space may be packed with asbestos wool or similar substance soaked with silicate of soda to which sulfuric acid of the proper specific gravity is added. The effect of the asbestos wool and the silicate of soda is to form a compact jelly-like substance, the sulfuric acid still being active as an electrolyte. When this jelly-like composition is used, no additional means will ordinarily be required to space the plates 2 and 3 from each other. As an alternative, however, the asbestos wool and the silicate of soda may be omitted and the cell may merely be filled with sulfuric acid, depending upon gaskets 6 and 7 to prevent leakage of the acid. In this case means must be provided to space the plates 2 and 3, which means is preferably in the form of a bridge 12, the structure of which is shown in Figs. 4 and 5. This bridge, which may be of hard rubber, is in the shape of an H, the legs of which are provided with lugs at their outer extremities to hold the plates in place. An alternative form of spacing device is shown in Fig. 6, and comprises a grooved wood separator 14 located between the plates, and a perforated rubber sheet 15 located between the wood separator and one of the plates. Any other suitable means may be employed for holding the plates in their proper positions within the tube.

The battery is preferably shipped from the factory with one end completely sealed, the other end put together loosely, and with no electrolyte in the tube. The dealer will then add sulfuric acid of the proper strength, charge the battery, and after charging, he will screw the loose cap 4 into place, screw into place the follower 9 in this cap and attach the corresponding wire 5 to the washer 9.

After the battery is discharged, it may be re-charged for further use. For purposes of re-charging I preferably provide a hole 10 in one of the caps 4, which hole is closed by a rubber screw 11. During re-charging this screw 11 can be removed in order to allow the escape of hot air or any gases which may be formed within the battery.

Although I have herein shown and described only one form of battery embodying my invention, it is understood that various changes and modifications may be made therein within the scope of the appended claims without departing from the spirit and scope of my invention.

Having thus described my invention, what I claim is:

1. A storage battery comprising a tubular container, and two semi-cylindrical plates located in said container.

2. A storage battery comprising a tubular container, two spaced semi-cylindrical plates located in said container, caps for the ends of said container, and terminals for said plates located in said two caps respectively.

3. A storage battery comprising a tubular container, two spaced semi-cylindrical plates located in said container, and an electrolyte surrounding said plates and consisting of asbestos wool, silicate of soda and sulfuric acid.

4. A storage battery comprising a tubular container, two spaced semi-cylindrical plates located in said container, and a jelly-like electrolyte packed in said container.

5. A storage battery comprising a tubular container, two spaced semi-cylindrical plates located in said container, caps for the ends of said container, terminals located in said caps, and conductors leading from said plates to said terminals.

6. A storage battery comprising a tubular container, and two oppositely disposed plates located therein each having a convex surface of substantially the same curvature as the inner wall of the container.

7. A storage battery comprising a tubular container, and two oppositely disposed semi-cylindrical plates located therein.

8. A storage battery comprising a tubular container, and two semi-cylindrical plates located therein and disposed on opposite sides of a plane passing through the longitudinal axis of the container.

9. A storage battery comprising a tubular container, two semi-cylindrical plates located therein and disposed on opposite sides of a plane passing through the longitudinal axis of the container, and a jelly-like electrolyte packed in said container and serving to maintain said plates in proper spaced relation.

10. A storage battery comprising a tubular container, two semi-cylindrical plates located therein and disposed on opposite sides of a plane passing through the longitudinal axis of the container, a liquid electrolyte in said container, and means for maintaining said plates in proper spaced relation.

11. A storage battery comprising a tubular container, two plates located therein, a cap for each end of said container and each of which caps is provided with a recess and a hole passing through the cap from the bottom of the recess, a terminal wire attached to each plate and projecting through the hole and recess in one of said caps, and a gasket and a follower for the recess in each cap, each follower being provided with a metallic washer to which the corresponding terminal wire is attached.

In testimony whereof I affix my signature.

THOMAS R. COOK.